United States Patent [19]

Sekine et al.

[11] Patent Number: 5,069,502
[45] Date of Patent: Dec. 3, 1991

[54] SUNROOF DRIVING APPARATUS

[75] Inventors: Shuji Sekine; Takeo Furuya; Tetsuya Obara, all of Yokohama, Japan

[73] Assignee: Jidosha Denki Kogyo K.K., Kanagawa, Japan

[21] Appl. No.: 549,837

[22] Filed: Jul. 9, 1990

[30] Foreign Application Priority Data

Jul. 10, 1989 [JP] Japan .................. 1-81087[U]
Sep. 5, 1989 [JP] Japan .................. 1-104225[U]

[51] Int. Cl.$^5$ ............................................. B60J 7/057
[52] U.S. Cl. ..................................... 296/223; 296/216
[58] Field of Search ............... 296/223, 216, 221, 222

[56] References Cited

U.S. PATENT DOCUMENTS

| 1,858,624 | 5/1932 | Hess et al. ............... 296/117 X |
| 2,985,483 | 5/1961 | Bishop et al. ............... 296/223 |
| 3,137,491 | 6/1964 | Coenen .................. 296/223 X |
| 4,626,027 | 12/1986 | Farmont ................. 296/223 |
| 4,671,559 | 6/1987 | Kolb .................... 296/117 X |
| 4,893,870 | 1/1990 | Moriya et al. ............ 296/223 |

FOREIGN PATENT DOCUMENTS

| 0034965 | 9/1981 | European Pat. Off. .......... 296/223 |
| 2937121 | 4/1981 | Fed. Rep. of Germany ...... 296/223 |
| 341919 | 1/1931 | United Kingdom ............. 296/223 |

Primary Examiner—Dennis H. Pedder
Attorney, Agent, or Firm—Sughrue, Mion, Zinn, Macpeak & Seas

[57] ABSTRACT

A sunroof driving apparatus includes a motor unit having a forwardly and reversely rotatable motor shaft and an output unit for converting rotation of the motor shaft into opening and closing movements of a sunroof lid. The motor unit and the output unit are disposed away from a roof of a motor vehicle.

3 Claims, 9 Drawing Sheets

SUNROOF DRIVING APPARATUS

FIELD OF THE INVENTION

This invention relates to a sunroof driving apparatus for use in opening and closing automatically a sunroof which is provided in a roof of a motor vehicle, for example.

DESCRIPTION OF THE PRIOR ART

Figure 10:
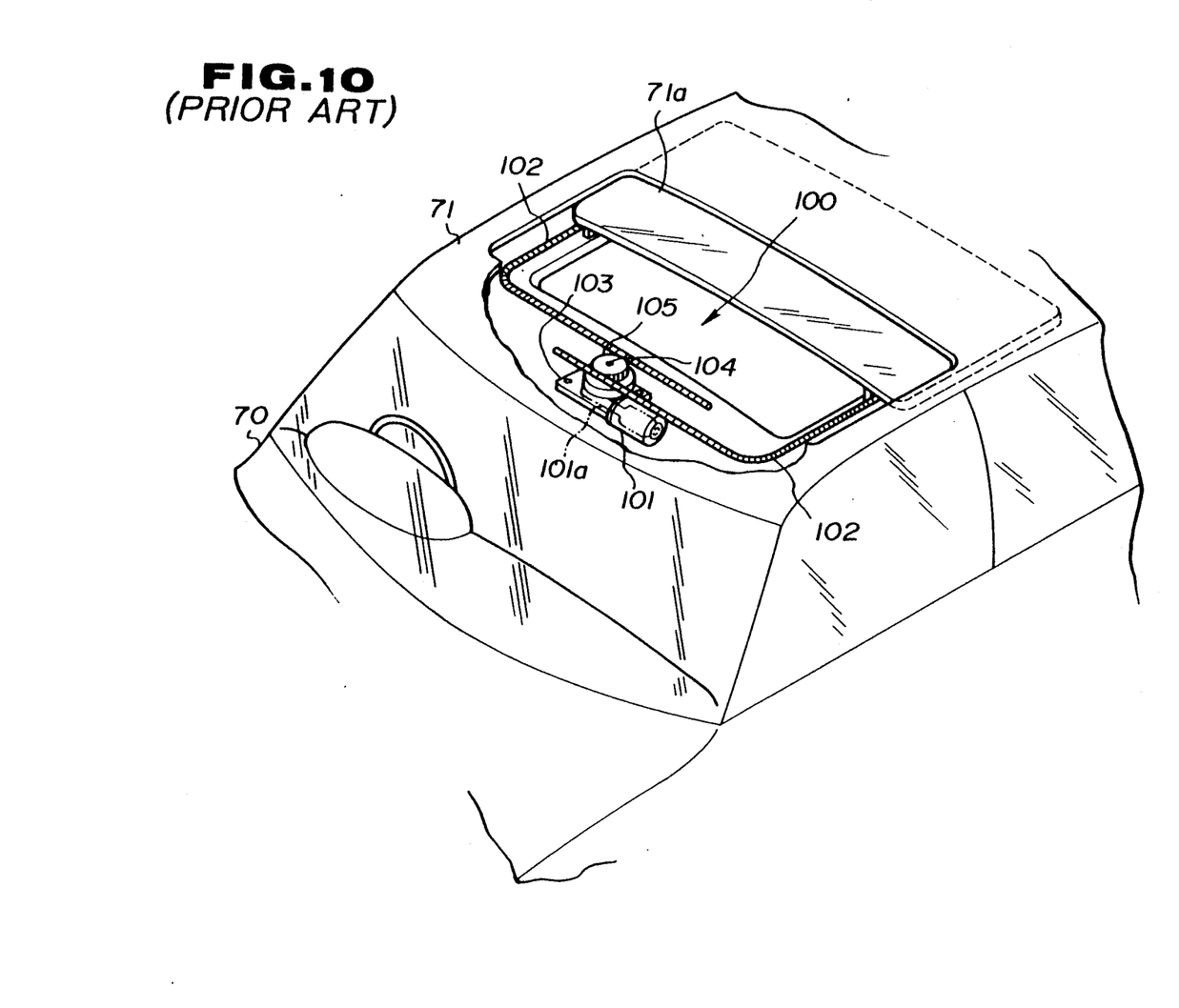
FIG. 10 is a perspective view illustrating the conventional sunroof driving apparatus.

Heretofore, there has been a sunroof driving apparatus as shown in FIG. 10, for example.

A sunroof driving apparatus 100 shown in the figure is mounted to a roof 71 in a frontward position of a vehicle body 70, is provided with a motor unit 101 having a forwardly and reversely rotatable motor shaft 101a according to the power supply, and an output unit 103 fixed to an end of said motor unit 101 in one body for converting the rotation of said motor shaft 101a into opening and closing movements of a sunroof lid 71a through driving wires 102, 102 of which ends are connected to said sunroof lid 71a respectively.

The motor shaft 101a of the motor unit 101 is formed with a worm (not shown) on the side of the output unit 103, and the worm is engaged with reduction gear (not shown) provided in the output unit 103.

The output unit 103 is so structured that an output shaft 104 is rotated through said reduction gear, and the output shaft 104 is fixed with an output gear 105.

The output gear 105 is engaged with the driving wires 102, 102.

In this state, changing over a sunroof switch (not shown) attached to, for example, the roof 71 into the opening side, the motor shaft 101a of the motor 101 rotates in the forward direction, and the output gear 105 of the output unit 103 rotates through said reduction gear in the anticlockwise direction in the figure, thereby driving the driving wires 102, 102 and the sunroof lid 71a is moved in the opening direction.

Upon changing over said sunroof switch into the closing side, the motor shaft 101a of the motor unit 101 rotates in the reverse direction, and the output gear 105 of the output unit 103 rotates through said reduction gear in the clockwise direction in the figure, thereby driving the driving wires 102, 102 and the sunroof lid 71a is so designed as to move in the closing direction.

However, in the aforementioned conventional sunroof driving apparatus 100, because both the motor unit 101 and the output unit 103 are mounted to the roof 71 in the frontward position of the vehicle body 70 and the size of the motor unit 101 in the vertical direction is comparatively large, a wide space is required between a roof foam lining and the roof 71 of the vehicle body 70. Therefore, there is a problem since an interior space of a passenger's compartment becomes smaller substantially. Further, it is unfavorable in the cost because it is necessary to wire as far as the roof 71 mounted with the motor unit 101. The noise from the motor unit reaches easily into ears of the driver and passengers in case of working of the motor unit 101 because the motor unit 101 is mounted in the position near to the ears of the driver or the passengers, and there is another problem since the apparatus is inferior in the quality.

SUMMARY OF THE INVENTION

This invention, therefore, is made in view of the aforementioned problems of the prior art and an object of the invention is to provide a sunroof driving device which does not take space so widely, is advantageous in the cost and superior in the quality.

The constitution of the sunroof driving apparatus according to this invention for attaining the above-mentioned object is characterized by comprising a motor unit having a motor shaft rotatable in forward and reverse directions according to electric power supply, and an output unit for converting rotation of said motor shaft into opening and closing movements of a sunroof lid, said motor unit or both said motor unit and said output unit being disposed away from a roof of a motor vehicle.

In the sunroof driving apparatus according to this invention, at least the motor unit is disposed away from the roof of the motor vehicle. Accordingly, the space between the roof and the roof foam lining becomes smaller, and the interior space of the passenger's compartment becomes wider practically. Further, the interior space becomes wider by disposing not only the motor unit but also the output unit away from the roof of the motor vehicle. And it is unnecessary to wire as far as the roof and it becomes hard to hear the noise from the motor.

DESCRIPTION OF THE PREFERRED EMBODIMENTS

The first embodiment of the sunroof driving apparatus according to this invention will be described below on basis of FIG. 1 to FIG. 5.

Figure 1:
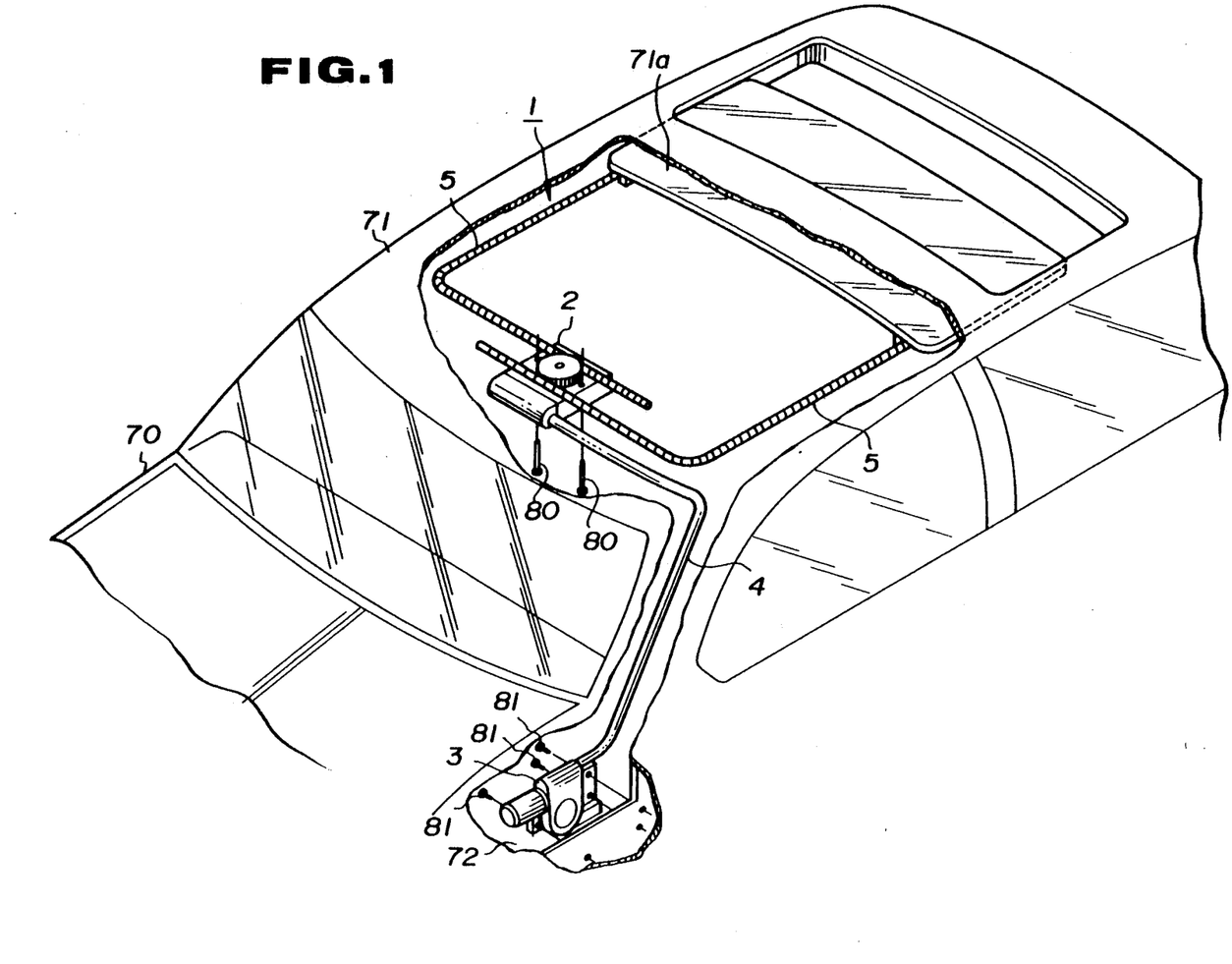
FIG. 1 is a perspective view illustrating the first embodiment of the sunroof driving apparatus according to this invention.

That is, a sunroof driving apparatus 1 shown in the figures has an output unit 2 mounted to a roof 71 in a rearward position of a vehicle body 70 by tightening screws 80, 80, and a motor unit 3 mounted in a trunk 72 of the vehicle body 70 away from said output unit 2 by tightening screws 81, 81.

The rotation of a motor shaft 3a of the motor unit 3 rotatable in forward and reverse directions according to electric power supply is transmitted to the output unit 2 through a power-transmission device 4 passed through to the roof 71 from the trunk 72, and the output unit 2 is so structured as to convert the rotation of the motor shaft 3a into opening and closing movements of a sunroof lid 71a through driving wires 5, 5 which are formed by winding wire around a wire rod in spiral.

Figure 2:
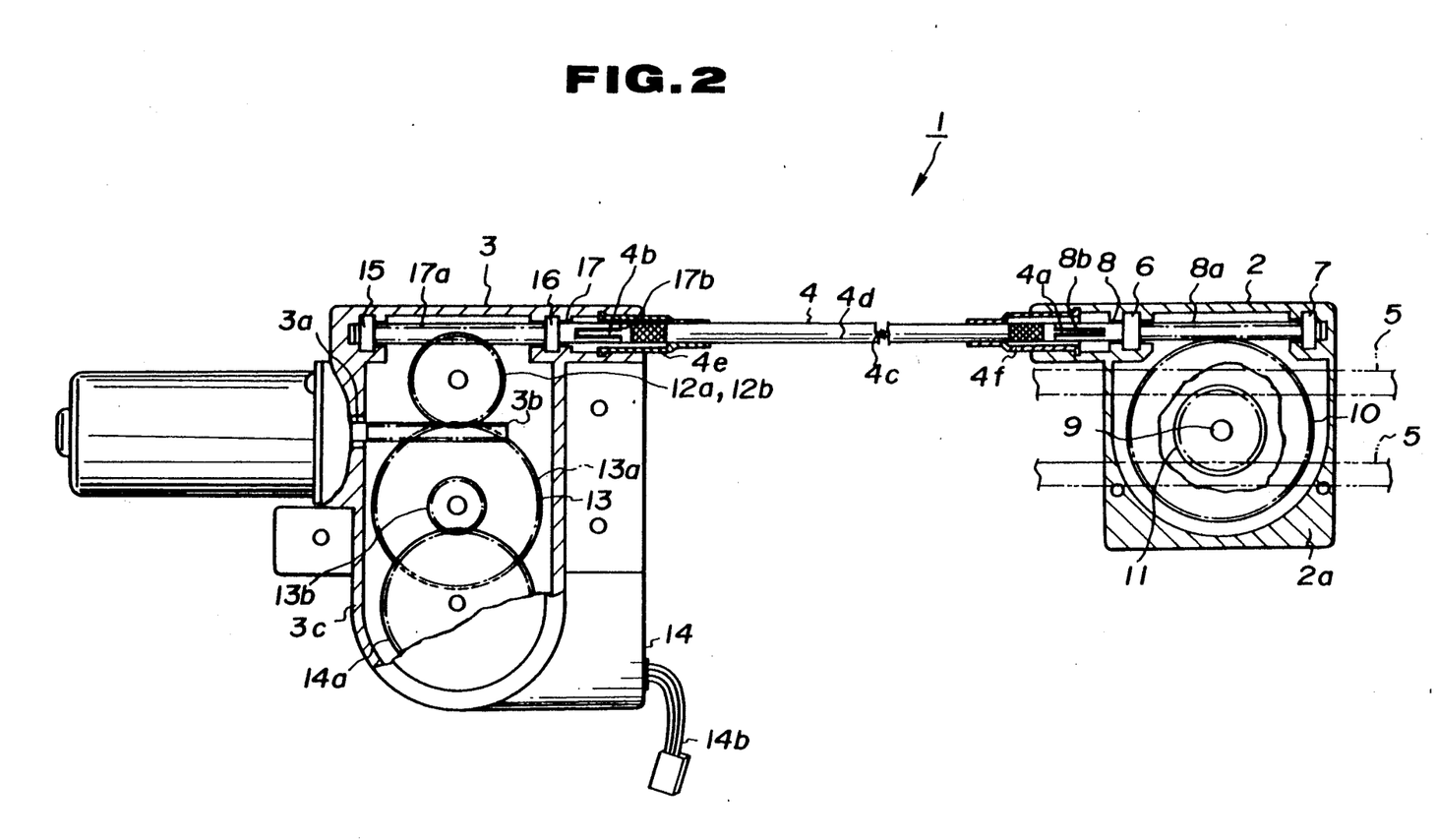
FIG. 2 is a partially sectional view illustrating the connection between the motor unit and the output unit of the sunroof driving apparatus shown in FIG. 1.

Said output unit 2 is provided with an input shaft 8 supported rotatably by bearings 6 and 7 on the upper side of a casing 2a thereof in FIG. 2.

Said input shaft 8 is formed with a worm 8a at the middle part thereof, said worm 8a is engaged with a worm wheel 10 fixed to an output shaft 9 supported rotatably by the casing 2a.

The output shaft 9 is fixed with an output gear 11 on the outside of the casing 2a for driving the driving wires 5, 5.

Furthermore, said input shaft 8 is formed with a cutout 8b on the left side thereof in FIG. 2, that is on the connecting side with the motor unit 3, for transmitting the rotation of the motor shaft to the output unit 2 by receiving a plate-shaped part 4a provided to an end of the power-transmission device 4 on the side of the output unit 2.

On the one side, in the motor unit 3, the motor shaft 3a is formed with a worm 3b on the left side thereof in FIG. 2, said worm 3b is engaged with a worm wheel 12a supported rotatably by a casing 3c on the upper side in FIG. 2. The worm wheel 12a is formed coaxially with a first intermediate gear 12b as a united one body.

On the lower side of said worm wheel 12a and the first intermediate gear 12b in FIG. 2, a second intermediate gear 13 made up of large and small sized double gears 13a and 13b is supported rotatably by the casing 3c. The first intermediate gear 12b is engaged with the larger gear 13a of the second intermediate gear 13, and smaller gear 13b of the second intermediate gear 13 is engaged with a gear 14a having a cam (not shown) provided to a position-detecting mechanism.

Said position-detecting mechanism 14 is attached to the casing 3c on the lower side in FIG. 2, and is so constructed as to switch on or off the power supplied to the motor unit 3 through a connecter 14b and to control the rotation of the motor shaft 3a by detecting the position of the sunroof lid 71a according to the rotational movement of the gear 14a having the cam.

Further, said motor unit 3 is provided with an output shaft 17 supported rotatably by bearings 15 and 16 on the upper side of the casing 3c in FIG. 2, and a worm 17a formed on the middle part of said output shaft 17 is engaged with said worm wheel 12a.

Furthermore, said output shaft 17 is formed with a cutout 17b on the right side thereof in FIG. 2, that is on the connecting side with the output unit 2, for transmitting the rotation of the motor shaft 3a to the power-transmission device 4 by receiving a plate-shaped part 4b provided to another end of the power-transmission device 4 on the side of the motor unit 3.

On the other side, the power-transmission device 4 is provided with a wire 4c which connects said plate-shaped part 4a installed to one end on the side of the output unit 2 and said plate-shaped part 4b installed to another end on the side of the motor unit 3 so as to rotate as one body in a flexible tube 4d, said power-transmission device 4 is fixed to the motor unit 3 and the output unit 2 by fitting respective joints 4e and 4f secured to both ends of the tube 4d into the end parts of the motor unit 3 and the output unit 2 respectively.

A sunroof switch (not shown) is disposed to an instrument panel or a console box, for example, a power source is connected to the motor unit 3 (position-detecting mechanism 14) in the trunk 72 through the sunroof switch. In this state, changing over said sunroof switch into the opening side, the motor shaft 3a rotates in the forward direction by supplying the motor unit 3 with electric power in the forward rotational direction. The rotation of the motor shaft 3a is transmitted to the output shaft 17 through the worm wheel 12a, and to the input shaft 8 of the output unit 2 from said output shaft 17 through the power-transmission device 4, and is transmitted to the output gear 11 from said input shaft 8 through the worm wheel 10.

Therefore, the driving wires 5, 5 are driven by the forward rotation of the output gear 11, and the sunroof lid 71a moves in the opening direction.

In this time, said position-detecting mechanism 14 is so designed as to shut off the power supply to the motor unit 3 by detecting that the sunroof lid 71a arrives at the full-opened position, thereby the sunroof lid 71a stops at the full-opened position.

In this state, changing over the sunroof switch into the closing side, the motor shaft 3a rotates in the reverse derection by supplying the motor unit 3 with electric power in the reverse rotational direction. The rotation of the motor shaft 3a is transmitted to the output gear 11 in the same manner as described above, the output gear 11 rotates in the reverse direction, thereby moving the sunroof lid 71a in the closing direction.

When the sunroof lid 71a arrives in a position just before the full-closed position, said position-detecting mechanism 14 shuts off the power supply to the motor unit 3, thereby stopping the sunroof lid 71a at the position just before the full-closed position temporarily.

Upon switching off the sunroof switch at this state, and further changing over said sunroof switch into the closing side, the motor unit 3 is supplied with electric power by the position-detecting mechanism 14, thereby, the motor shaft 3a rotates in the reverse direction and moves the sunroof lid 71a to the full-closed position.

When the sunroof lid 71a arrives at the full-closed position, said position-detecting mechanism 14 shuts off the power supply to the motor unit 3, thereby stopping the sunroof lid 71a at the full-closed position.

At the time of the operation as described above, noise from the motor does not reach ears of the driver and passengers scarcely, because the motor unit 3 works in the trunk 72 of the vehicle body 70 away from the driver and the passengers.

Figure 3:
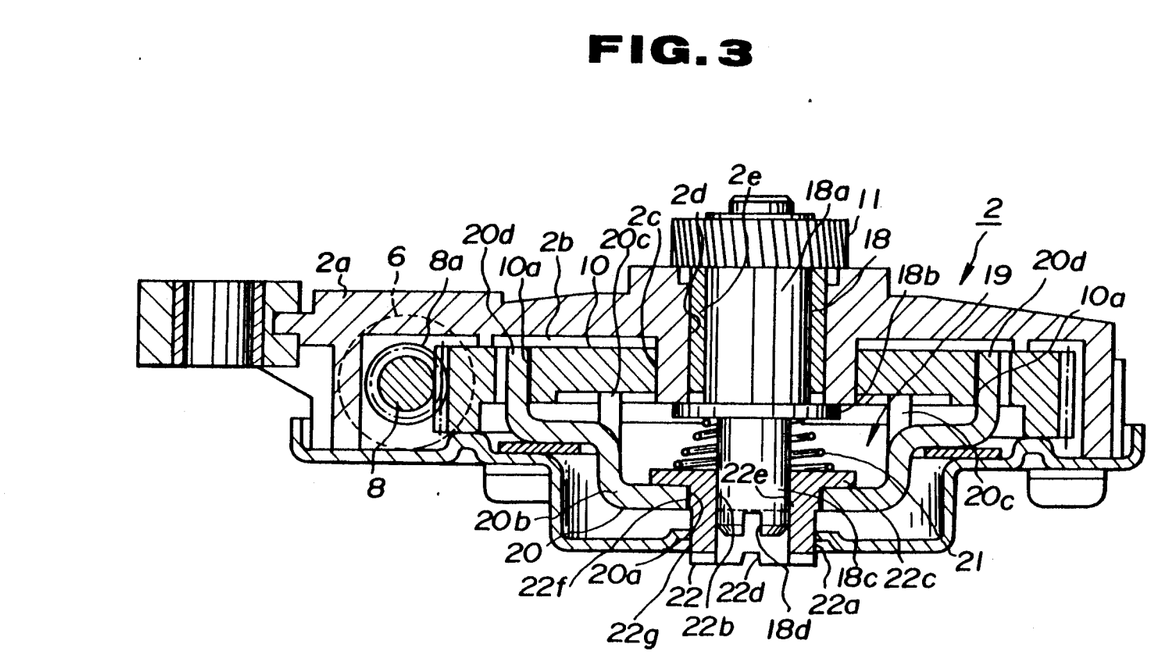
FIG. 3 is a vartical sectional view illustrating the clatch mechanism provided to the output unit of the sunroof driving apparatus shown in FIG. 1.
Figure 4:
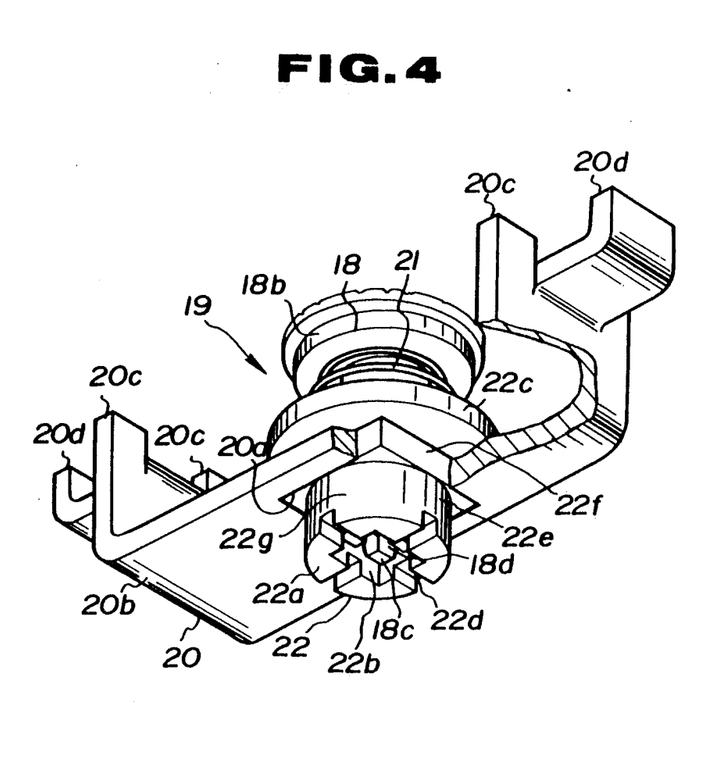
FIG. 4 and FIG. 5 are partially cutaway perspective views illustrating the relationship between the arm member and the intermitting member of the clutch mechanism shown in FIG. 3.
Figure 5:
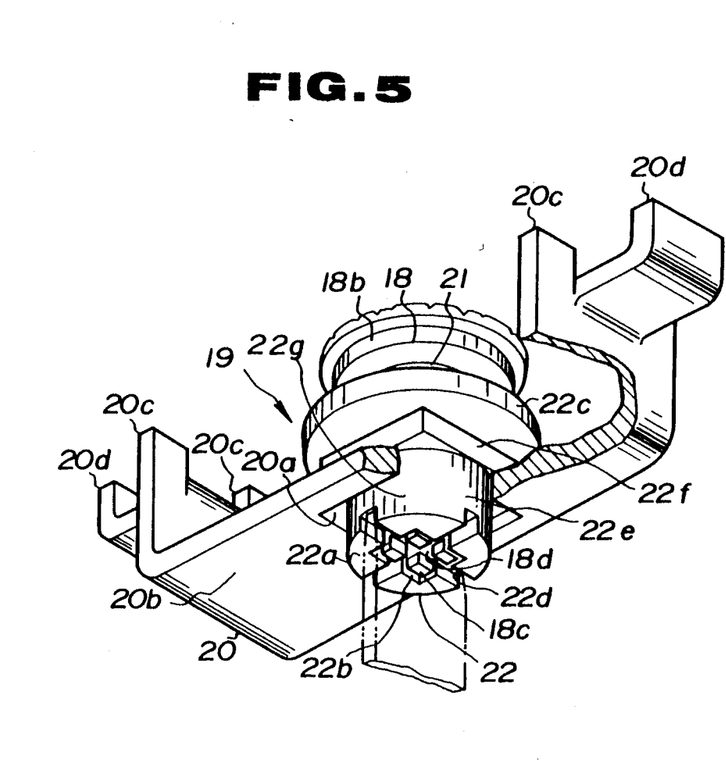

In addition, in the sunroof driving apparatus 1, it becomes possible to facilitate the manual operation of the sunroof lid 71a by equipping a clutch mechanism as shown in FIG. 3 to FIG. 5 to said output unit 2.

Namely, in the output unit 2 shown in FIG. 3, said input shaft 8 extrudes into a gear housing part 2b of the casing 2a, the worm 8a formed on said input shaft 8 is engaged with the worm wheel 10 in the gear housing part 2b as described above, and the worm wheel 10 is supported rotatably by a worm wheel bearing 2c provided to the casing 2a.

An output shaft 18 is supported rotatably by a bearing 2e fitted into an output shaft hole 2d of the casing 2a for outputting the rotation transmitted from the motor unit 3 through the power-transmission device 4, said output unit 2 is provided with a clutch mechanism 19 between said worm wheel 10 and the output shaft 18 for connecting and disconnecting the rotation of the input shaft 8 to the output shaft 18.

The output shaft 18 is provided with a trunk part 18a supported rotatably by said bearing 2e, and attached with the output gear 11 on the outside of the casing 2a, on the upper side of said trunk part 18a in FIG. 3. The output shaft 18 is provided a stopper 18b having an outer diameter larger than that of the trunk part 18a on the under side of said trunk part 18a in FIG. 3.

Further, said output shaft 18 is provided with a rectangular column-shaped shaft part 18c having an outer diameter smaller than that of the trunk part 18a on the under side of said stopper 18b in FIG. 3, and is formed with cross-shaped grooves 18d, 18d cut out crosswise in order to fit the tool such as a screwdriver or the like in the lower end of said rectangular column-shaped shaft part 18c in FIG. 3.

The worm wheel 10 is provided fitting holes 10a and 10a at two places opposed each other and near to the outer periphery thereof for attaching an arm member 20 (will be described later) of the clutch mechanism 19.

On the one side, the clutch mechanism 19 comprises the arm member 20 attached to the fitting holes 10a and 10a provided in said worm wheel 10 and having an engaging hole 20a, a spring 21 fitted on said output shaft 18 and an intermitting member 22 to be engaged with the engaging hole 20a and disengaged from said fitting hole 20a.

Said arm member 20 is provided with said engaging hole 20a being a square opening in this embodiment in the middle part of an arm body 20b having U-shaped cross section, and is provided with contact ends 20c and 20c extruding upwardly in FIG. 3 and in contact with the worm wheel 10 respectively and insertion ends 20d and 20d for securing the arm 20 to the worm wheel 10 by inserting them into said fitting holes 10a and 10a at both end parts of said arm body 20b.

The intermitting member 22 is provided with a square-shaped through hole 22b pierced vertically in the center of a member body 22a having T-shaped cross section, and is fitted movably in the vertical direction by inserting the rectangular column-shaped shaft part 18c formed on said output shaft 18 into said through hole 22b in FIG. 3.

The intermitting member 22 is provided with a disk shaped stopper 22c on the upper end of the member body 22a, and with grooves 22d, 22d cut out so as to be coincident with the cross-shaped grooves 18d, 18d of said output shaft 18 in the lower end thereof in FIG. 3.

The intermitting member 22 is also provided with a shaft 22e having an outer diameter as small as the shaft part 22e may be inserted into the engaging hole 20a provided in said arm member 20 on the under side of said stopper 22c, and the shaft part 22e is provided with an engaging part 22f having outside dimensions slightly smaller than inside dimensions of the engaging hole 20a and having square column shape similar to the shape of said engaging hole 20a at the position adjacent to the stopper 22c on the upper part thereof in FIG. 3 for engaging said engaging hole 22a.

Furthermore, said intermitting member 22 provided with a cylindrical part 22g having an outer diameter smaller than inside dimensions of said engaging hole 20a and fitted into said engaging hole 20a with some play on the under side of the engaging part 22f provided on said shaft part 22e.

On the other side, the spring 21 is a conical spring, is fitted on the output shaft 18 at the state in which one end of the spring 21 is in contact with the stopper 18b of the output shaft 18 and another end of the spring 21 is in contact with the stopper 22c of the intermitting member 22 receiving the rectangular column-shaped shaft part 18c of the output shaft 18, and the intermitting member 22 is energized downwardly by said spring 21, the engaging part 22f of the intermitting member 22 is engaged to the engaging hole 20a provided in the arm member 20 as shown in FIG. 3.

Accordingly, the clutch mechanism 19 is so structured that the rotation of the arm member 20 is transmitted to the output shaft 18 when the engaging part 22f of the intermitting member 22 is engaged with the engaging hole 20a provided in the arm member 20 by elasticity of the spring 21 as also shown in FIG. 4, and the rotation of the arm member 20 is not transmitted to the output shaft 18 when the intermitting member 22 is moved upwardly in FIG. 3 against the elasticity of the spring 21 and said engaging part 22f is disengaged from the engaging hole 20a as also shown in FIG. 5.

Hereupon, supplying the motor unit 3 with electric power in the forward rotational direction by changing over the sunroof switch into the opening side, the rotation of the motor shaft 3a of the motor unit 3 is transmitted to the input shaft 8 in the output unit 2 from the output shaft 17 in the motor unit 3 through the power-transmission device 4, and the worm wheel 10 is rotated through the worm 8a.

The arm member 20 attached to the worm wheel 10 is rotated together with worm wheel 10 by the rotation of the worm wheel 10.

Since the engaging part 22f of the intermitting member 22 is engaged with the engaging hole 20a of the arm member 20 as shown in FIG. 4, the rotation of the arm member 20 is transmitted to the output shaft 18 through the intermitting member 22, the sunroof lid 71a is moved in the opening direction by the rotation of the output gear 11 through the driving wires 5, 5.

Upon supplying the motor unit 3 with electric power in the reverse rotational direction by changing over the sunroof switch into the closing side, the reverse rotation of the motor shaft 3a is transmitted to the input shaft 8, the reverse rotation of the input shaft 8 is transmitted to the output gear 11 in the same manner as described above, and the sunroof lid 71a moves in the closing direction.

In case the sunroof driving apparatus 1 falls into the state in which the motor unit 3 can not be operated automatically owing to some trouble such as an over-discharging of the battery, the intermitting member 22 is forced upwardly in FIG. 3 against the elasticity of the spring 21 by inserting the tool such as a screwdriver into the grooves 22d, 22d formed in the lower end of said intermitting member 22 as shown in FIG. 5.

By adjusting said grooves 22d, 22d with the cross-shaped grooves 18d, 18d formed in the lower end of the output shaft 18, the engaging part 22f of the intermitting member 22 is disengaged from the engaging hole 20a of the arm member 20, thereby the output shaft 18 is disconnected from the worm wheel 10. Accordingly, the output shaft 18 is rotated by turning said tool with hand, and the sunroof lid 71a becomes possible to be moved very easily in the opening and closing directions by manual operation.

Figure 6:
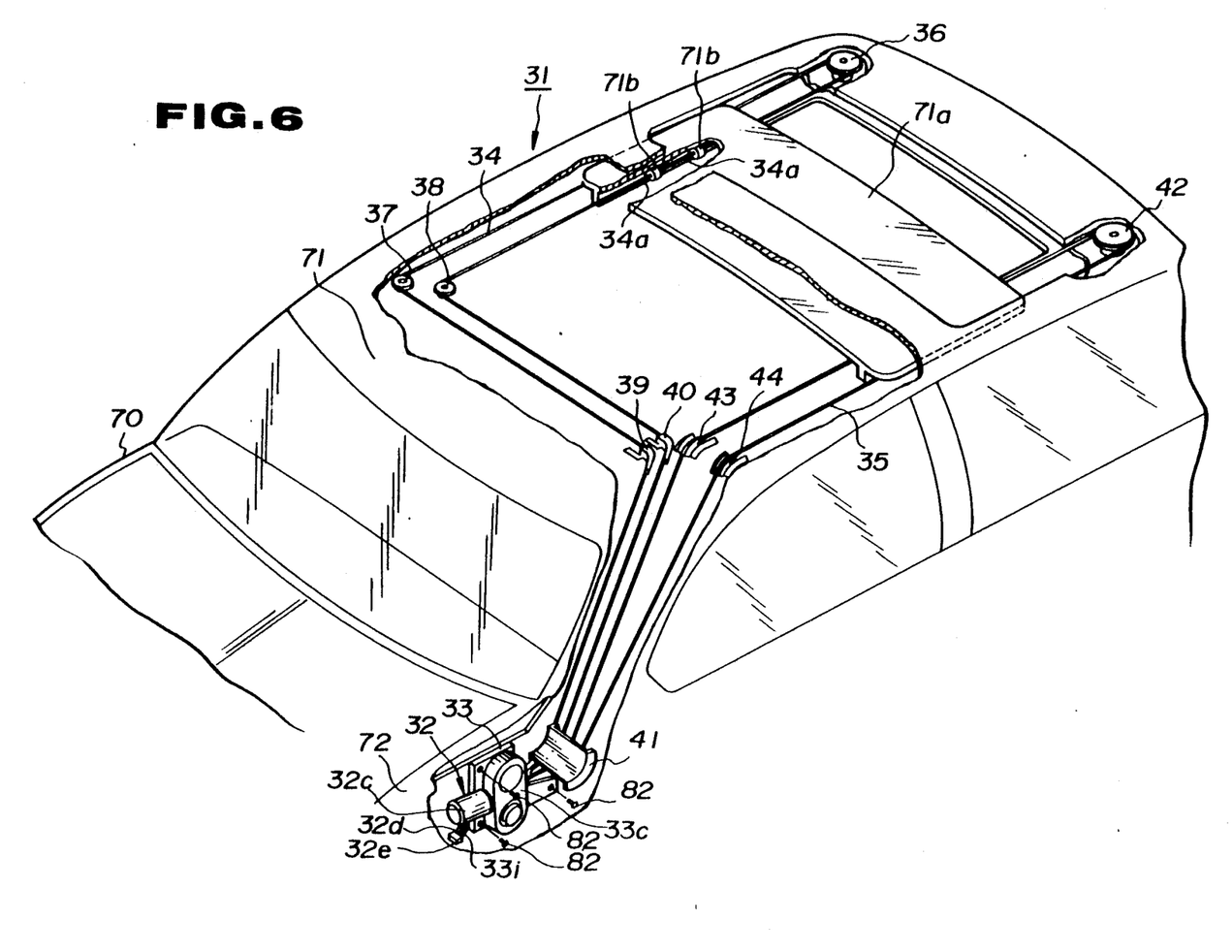
FIG. 6 is a perspective view illustrating the second embodiment of the sunroof driving apparatus according to this invention.
Figure 7:
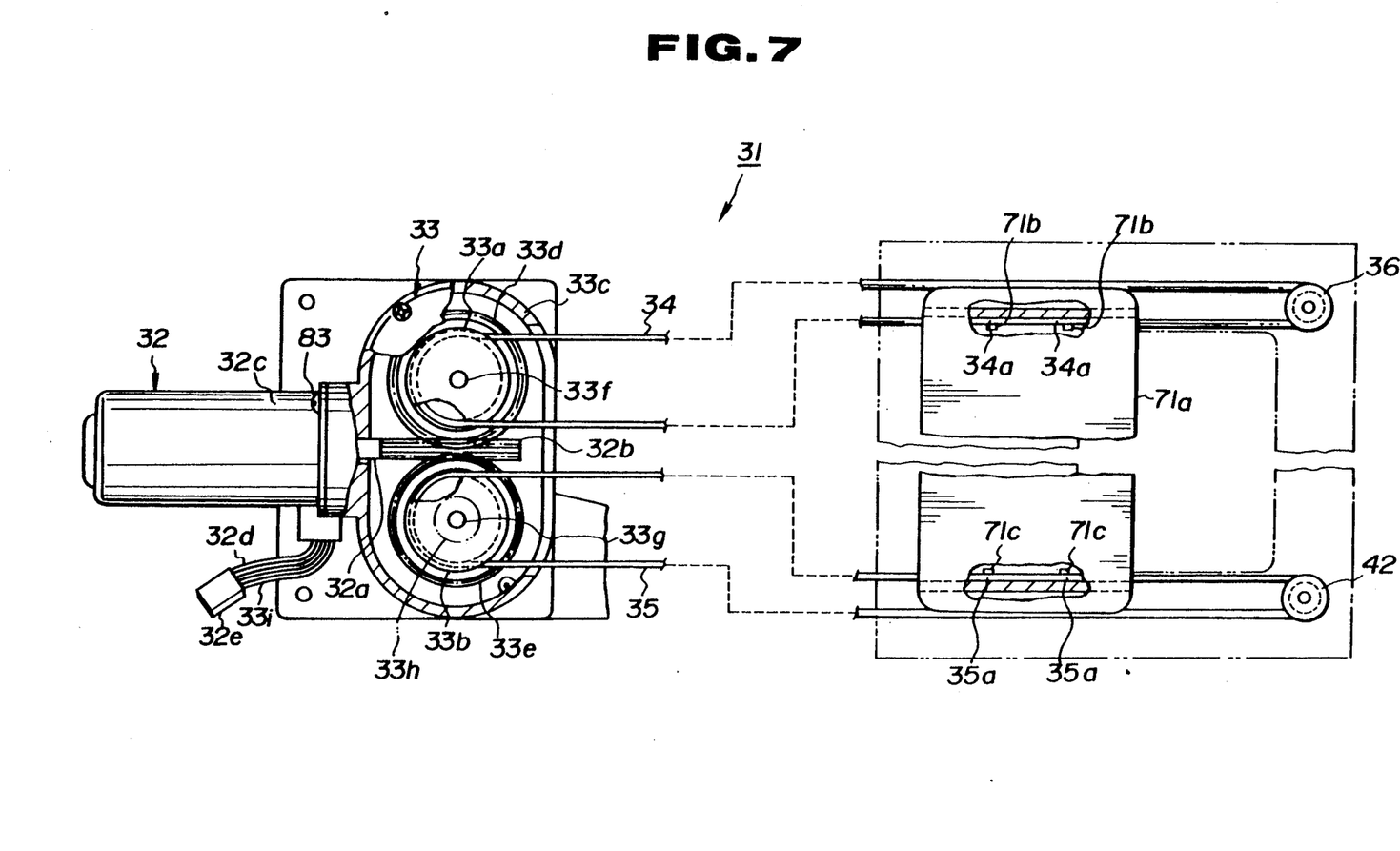
FIG. 7 is a partially sectional view illustrating the power transmission from the motor unit in the sunroof driving apparatus shown in FIG. 6.

FIG. 6 and FIG. 7 show the second embodiment of the sunroof driving apparatus according to this invention, in a sunroof driving apparatus 31 shown in the figures, a motor unit 32 and an output unit 33 are disposed in a trunk 72 away from a roof 71 of a vehicle body 70 by tightening screws 82, 82, and drums 33a and 33b provided in said output unit 33 are set with endless driving cords 34 and 35 connected with a sunroof lid 71a respectively, therefore said sunroof lid 71a is so structured as to move by linking said respective drums 33a and 33b according to the rotation of a motor shaft 32a provided in the motor unit 32.

In the motor unit 32, said motor shaft 32a is formed with a worm 32b on the rightward end thereof protruding into the output unit 33 as shown in FIG. 7.

Said motor unit 32 is fixed in one body to a gear casing 33c housing the output unit 33 by tightening a screw 83 at an opening side of a motor casing 32c thereof.

On the one side, in the output unit 33, respective worm wheels 33d and 33e engaged with the worm 32b formed on said motor shaft 32a are supported rotatably by respective shafts 33f and 33g provided in the gear casing 33c, and said respective worm wheels 33d and 33e are installed with said respective drums 33a and 33b coaxially.

In case said motor shaft 32a rotates in the forward direction, the drum 33a (on the upper side in FIG. 7) is rotated in the clockwise direction in FIG. 7, and another drum 33b (on the lower side in FIG. 7) is rotated in the anticlockwise direction in FIG. 7 by the power transmitted from the worm 32b to the respective worm wheels 33d and 33e.

When the motor shaft 32a rotates in the reverse direction, the drum 33a is rotated in the anticlockwise direction in FIG. 7, and another drum 33b is rotated in the clockwise direction in FIG. 7 by the power transmitted similarly to above.

Also in this embodiment, said drum 33b on the lower side in FIG. 7 is disposed with a position-detecting mechanism 33h for detecting the rotational position of said drum 33b, external wirings 33i of said position-detecting mechanism is fitted to the connector 32e together with external wirings 32d which supply electric power to said motor unit 32.

On the other side, the driving cords 34 and 35 are formed in endless shapes with wire cord or synthetic resinous cord having little extensibility.

Said driving cord 34 is passed turningly between a pulley 36 disposed rotatably on the left side of the front part of the roof 71 and the drum 33a provided in the output unit 33 through guide pulleys 37 and 38 disposed rotatably on the left side of the rear part of the roof 71, and through guides 39 and 40 disposed on the right side of the rear part of the roof 71 and a guide 41 disposed in the trunk 72 as shown in FIG. 6.

The driving cord 34 is connected to connecting parts 71b and 71b provided to the sunroof lid 71a at securing positions 34a and 34a located between said pulley 36 and the guide pulley 38.

Another driving cord 35 is passed turningly between a pulley 42 disposed rotatably on the right side of the front part of the roof 71 and another drum 33b provided in the output unit 33 through guides 43 and 44 disposed on the right side of the rear part of the roof 71 and said guide 41 disposed in the trunk 72 as shown in FIG. 6.

Further, said driving cord 35 is connected to connecting parts 71c and 71c provided to the sunroof 71a at securing positions 35a and 35a located between said pulley 42 and the guide 43 as shown also FIG. 7.

Then, a sunroof switch (not shown) is disposed to an instrument panel or a console box, for example, a power source is connected to the external wirings 2d of the motor unit 32 and the external wirings 33i of the position-detecting mechanism 33h in the trunk 72 through the sunroof switch.

Upon supplying the electric power to the motor unit 32 in the forward rotational direction and rotating the motor shaft 32a in the forward direction by changing over said sunroof switch in the opening side, the drum 33a provided in the output unit 33 rotates in the clockwise direction at the same time, another drum 33b rotates in the anticlockwise direction in FIG. 7.

Thereby, the securing positions 34a and 35a of the respective driving cords 34 and 35 are driven in the leftward direction in FIG. 7, and the sunroof lid 71a is moved in the opening direction.

In this time, when the sunroof lid 71a arrives at the full-opened position, the position-detecting mechanism 33h shuts off the power supply to the motor unit 32 by detecting the position of the sun-roof lid 71a so that the sunroof lid 71a stops at the predetermined full-opened position.

Further, supplying the electric power to the motor unit 32 in the reverse rotational direction and rotating the motor shaft 2a in the reverse direction by changing over the sunroof switch in the closing side, the drum 33a provided in the output unit 33 rotates in the anticlockwise direction, at the same time another drum 33b rotates in the clockwise direction in FIG. 7.

Thereby, the securing positions 34a and 35a of the respective driving cords 34 and 35 are driven in the rightward direction in FIG. 7, and the sun-roof lid 71a is moved in the closing direction.

When the sunroof lid 71a arrives at the predetermined full-closed position, the position-detecting mechanism 33h shuts off the power supply to the motor unit 32 by detecting the position of the sunroof lid 71a, thereby stopping the sunroof lid 71a at the predetermined full-closed position.

At the time of the operation, noise from the motor unit 32 and the output unit 33 does not reach ears of the driver and passengers scarcely, because said motor unit 32 and the output unit 33 work in the trunk 72 away from the driver and the passengers.

Figure 8:
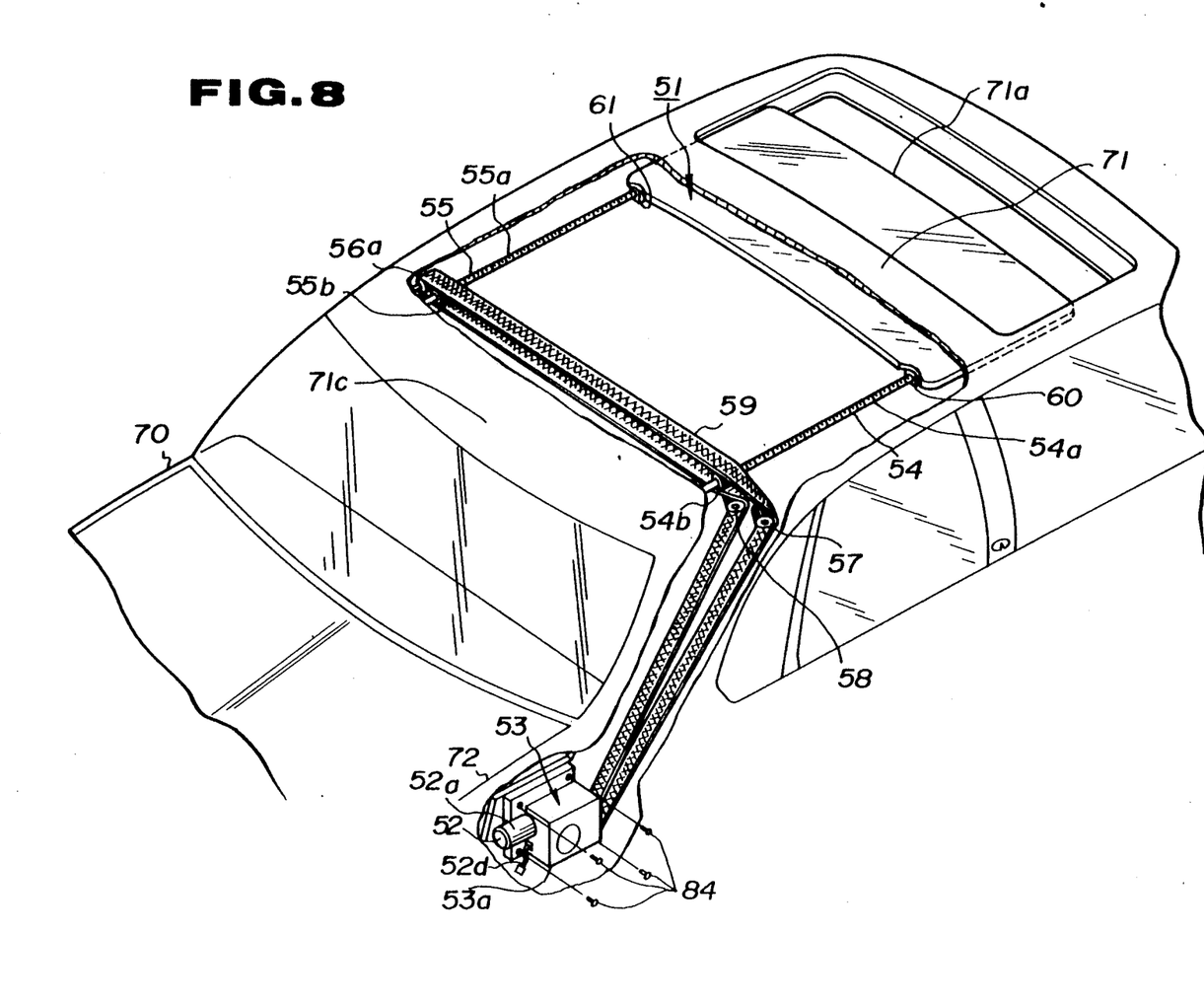
FIG. 8 is a perspective view illustrating the third embodiment of the sunroof driving apparatus according to this invention.
Figure 9:
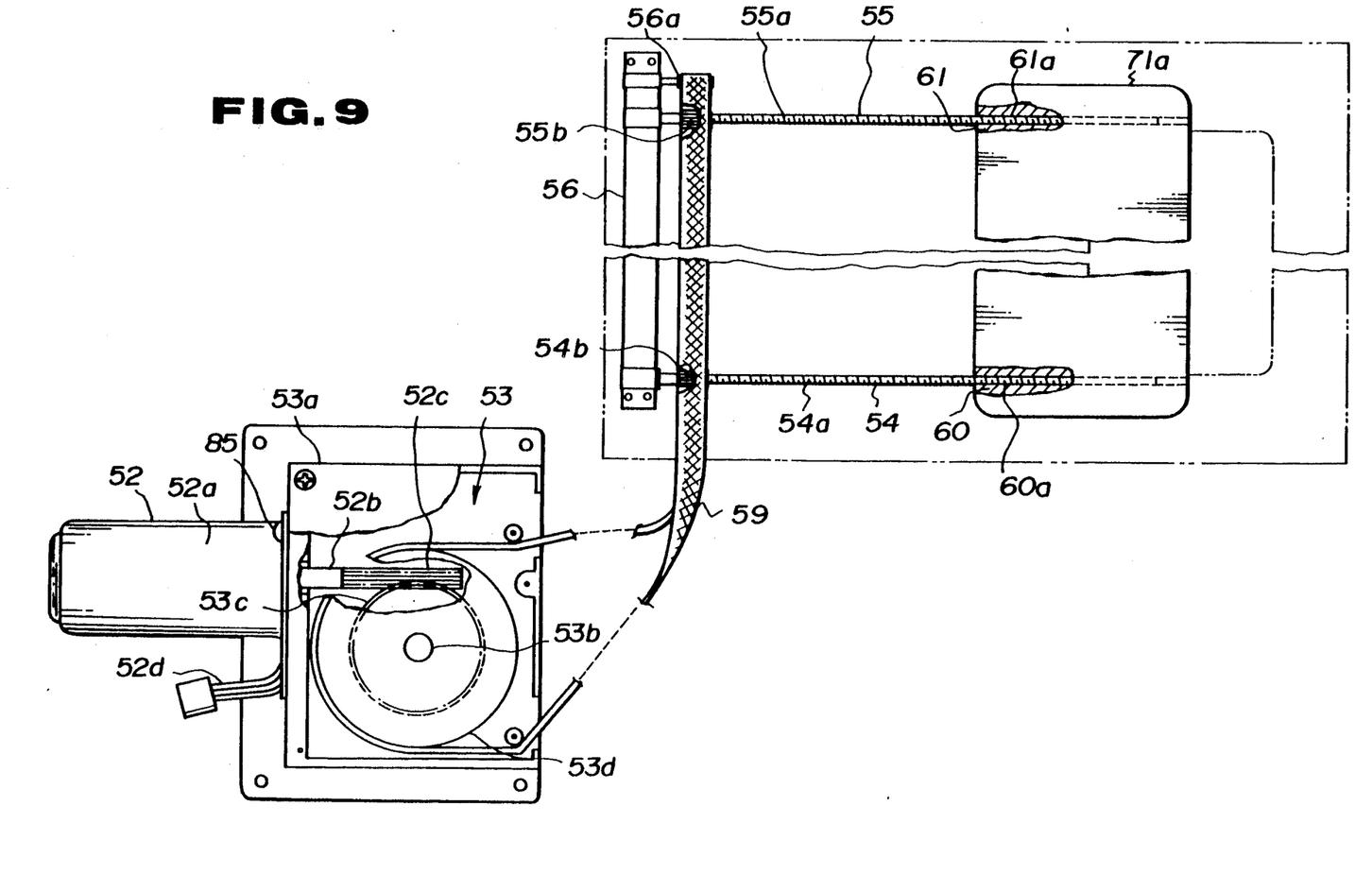
FIG. 9 is a partially sectional view illustrating the power transmission from the motor unit in the sunroof driving apparatus shown in FIG. 8.

FIG. 8 and FIG. 9 show the third embodiment of the sunroof driving apparatus according to this invention, in a sunroof driving apparatus 51 shown in the figures, a motor unit 52 and an output unit 53 are fixed in the trunk 72 away from the roof 71 of the vehicle body 70 by tightening screws 84, 84.

A motor casing 52a of the motor unit 52 is fixed in one body to a gear casing 53a housing the output unit 53 by tightening a screw 85.

A motor shaft 52b provided in the motor unit 52 protrudes into the inner part of the gear casing 53a, and is formed with a worm 52c on the protruding part thereof.

The output unit 53 fixed with a shaft 53b to the gear casing 53a, a worm wheel 53c engaged with said worm 52c is supported in rotatable state.

The worm wheel 53c is attached with a pulley 53d in one body, said pulley 53d is so designed as to rotate together with the worm wheel 53c which is rotated by the rotation of the motor shaft 52b engaging with the worm 52c according to power supply through external wirings 2d provided to the motor unit 52.

On the one side, the roof 71 is disposed with two lead screws 54 and 55 in parallel to the movable direction of the sunroof lid 71a, which is supported rotatably by the screw holder 56 fixed to a roof end 71c.

The respective lead screws 54 and 55 are provided with spur gears 54b and 55b at the respective base end sides of male screw parts 54a and 55a, and said screw holder 56 is provided with a roller 56a rotatably on the upper side in FIG. 9.

The roof end 71b is disposed with guide rollers 57 and 58 at the prescribed position on the opposite side of the roller 56a of the screw holder 56a.

A driving belt 59 which is formed in endless loop with synthetic resin having flexibility and little extensibility is put on said pully 53d in the output unit 53 and said roller 56a of the screw holder 56 through the guide rollers 57 and 58, and which is engaged with the spur gear 54b provided on said lead screw 54 and the spur gear 55b provided on said lead screw 55 at the position between said roller 56a and the guide rollers 57 and 58.

Said sunroof lid 71a is installed with travellers 60 and 61 provided with female screw parts 60a and 61a forming screw pairs with the male screw parts 54a and 55a of the respective lead screws 54 and 55 on the inside thereof, and the rotational motions of the respective lead screews 54 and 55 are converted respectively to the straight-line motions in the axial direction of the respective lead screws 54 and 55 by said travellers 60 and 61, thereby the sunroof lid 71a is designed so as to move in the opening and closing directions.

Then, a sunroof switch (not shown) is disposed in a position at driver's elbow such as an instrument panel, a console box or the like, and a power source is connected to the external wirings 52d of the motor unit 52 through a position-detecting switch (not shown) and said sunroof switch.

Upon supplying the motor unit 52 with electric power in the forward rotational direction by changing over the sunroof switch into the opening side, the motor shaft 52b rotates in the forward direction and the pulley 53d is rotated in the clockwise direction in FIG. 9 through the worm wheel 53c in the output unit 53.

According to the rotation of the pulley 53d in the clockwise direction in FIG. 9, the respective lead screws 54 and 55 are rotated by the driving belt 39 in the clockwise direction in FIG. 8.

The travellers 60 and 61 are moved by the rotation of respective lead screws 54 and 55 in the leftward direction in FIG. 9, the sunroof lid 71a moves in the opening direction, that is leftward direction in FIG. 9. And when the sunroof lid 71a arrives at the full-opened position, the power supply to the motor unit 52 is shut off by said position-detecting switch.

Upon supplying the motor unit 52 with electric power in the reverse rotational direction by changing over the sunroof switch into the closing side, the motor shaft 52b rotates in the reverse direction and makes the pulley 53d rotate in the anticlockwise direction in FIG. 9 through the worm wheel 53c in the output unit 53, thereby moving the travellers 60 and 61 in the rightward direction in FIG. 9 similarly to above, and the sunroof lid 71a moves in the closing direction.

When the sunroof lid 71a arrives at the full-closed position, the power supply to the motor unit 52 is shut off by said position-detecting switch, so that the sunroof lid 71a stops at the full-closed position.

At the time of the aforementioned operation, noise from the motor unit 52 and the output unit 53 does not reach ears of the driver and passengers substantially, because said motor unit 52 and the output unit 53 work in the trunk 72 away from the driver and the passengers.

As described above, the sunroof driving apparatus according to this invention comprises a motor unit having a motor shaft rotatable in forward and reverse directions according to electric power supply and an output unit for converting rotation of said motor shaft into opening and closing movements of a sunroof lid, and said motor unit or both said motor unit and said output unit are disposed away from a roof of a motor vehicle. Therefore, excellent effects can be obtained in that the interior space of the passenger's compartment becomes wider substantially, and it is unnecessary to wire as far as the roof, furthermore the noise from the motor unit disappears.

What is claimed is:

1. A sunroof driving apparatus comprising:
   a motor unit disposed away from a roof of a motor vehicle and having a motor shaft rotatable in forward and reverse directions according to electric power supply; and
   an output unit disposed away from the roof and united with said motor unit as one body, said output unit having a pair of rotatable worm wheels operatively connected to a sunroof lid and said motor shaft having a worm gear thereon disposed between said worm wheels in meshing engagement therewith for converting rotation of said motor shaft into opening and closing movements of said sunroof lid.

2. A sunroof driving apparatus as set forth in claim 1, further comprising a drum fixed coaxially to each worm wheel, a pair of pulleys mounted in the roof and a driving cord entrained about each drum and a respective pulley and connected to said sunroof lid for driving said sunroof lid upon rotation of said worm wheels.

3. A sunroof driving apparatus comprising:
   a motor unit disposed away from a roof of a motor vehicle and having a motor shaft rotatable in forward and reverse directions according to electric power supply;
   an output unit disposed away from the roof and united with said motor unit as one body, said output unit having a rotatable worm wheel and said motor shaft having a worm gear disposed in meshing engagement with said worm wheel;
   a lead screw rotatably mounted in said roof and operatively connected to a sunroof lid; and
   a driving belt disposed in operative fashion with said lead screw and a pulley on said worm wheel for imparting rotation of said worm wheel to said lead screw for driving said sunroof lid.

* * * * *